United States Patent [19]

Zimmer

[11] Patent Number: 5,375,896
[45] Date of Patent: Dec. 27, 1994

[54] BUCKET MECHANISM, PARTICULARLY A SHIP UNLOADER

[75] Inventor: Karl-Ernst Zimmer, Riegelsberg, Germany

[73] Assignee: PWH Anlagen & Systeme GmbH, Ingbert-Rohrbach, Germany

[21] Appl. No.: 65,798

[22] Filed: May 24, 1993

[51] Int. Cl.⁵ .................... B63B 27/22; B65G 67/60
[52] U.S. Cl. ...................... 294/68.1; 414/141.1; 414/142.5; 198/714; 37/444
[58] Field of Search .............. 294/54.5, 55, 68.1, 294/68.22, 68.23, 68.26, 68.27; 37/353, 444, 460, 465; 414/140.8, 140.9, 141.1, 141.2, 142.5, 142.9, 685, 722; 198/509, 713, 714

[56] References Cited

U.S. PATENT DOCUMENTS

| 1,638,099 | 8/1927 | Rorabeck | 37/465 |
| 3,037,305 | 6/1962 | Penote | 37/465 X |
| 4,765,072 | 8/1988 | Schroeder | 37/465 |

FOREIGN PATENT DOCUMENTS

| 1367597 | 6/1964 | France | 37/353 |
| 588055 | 10/1933 | Germany . | |
| 648757 | 7/1937 | Germany . | |
| 1234622 | 2/1967 | Germany . | |
| 2717109 | 1/1978 | Germany . | |
| 3129678 | 2/1983 | Germany . | |
| 3150441 | 6/1983 | Germany . | |
| 3336015 | 4/1985 | Germany . | |
| 3612424 | 10/1987 | Germany . | |
| 4013245 | 10/1991 | Germany . | |
| 651827 | 4/1951 | United Kingdom . | |

*Primary Examiner*—Dean J. Kramer
*Attorney, Agent, or Firm*—Spencer, Frank & Schneider

[57] ABSTRACT

Proposed is a bucket mechanism, particularly a ship unloader, which includes at least one rotating traction member with receiving elements fastened thereto. The receiving elements are formed of a stiff supporting member, with an elastically yielding material receiving region disposed therebelow which is preferably composed of an elastically deformable supporting frame of steel leaf springs and a rubber bucket inserted therein.

10 Claims, 1 Drawing Sheet

BUCKET MECHANISM, PARTICULARLY A SHIP UNLOADER

CROSS REFERENCE TO RELATED APPLICATION

This application is based on German Application Ser. No. P 42 06 874.6, the subject matter of which is incorporated herein by reference.

BACKGROUND OF THE INVENTION

The present invention relates to a bucket mechanism, particularly a ship unloader, which includes at least one rotating traction member to which the individual receiving elements are fastened.

German Unexamined Published Patent Application DE-OS 2,717,109 relates to an endless conveyor for bringing up bulk materials by means of bucket or box shaped conveying units which are arranged along an endless carrier guided around reversal rollers that have a horizontal rotation axis. Each conveying unit has a transporting wall that connects two side walls and carries along the bulk material. The conveying units each have an liner that places itself against the interior of the transporting wall and is configured and mounted so as to be movable in itself within limits in the conveying direction relative to the transporting wall. The transporting walls are mounted so as to be pivotal within limits in their base regions and are subdivided in height at least once by way of hinges. The liners are configured as aprons of a rubber-elastic material that are fastened in the region of the carrier. Bucket mechanisms of this type are suitable to produce good material removal in the discharge region particularly since the material has less of a tendency to bake onto the rubber than onto the actual receiving element which is generally made of steel. If such a bucket mechanism is employed, for example, as a ship unloader, the danger exists that the buckets that are in engagement are pushed onto the material during unloading of bulk material from a ship that is pitching in the waves and may be deformed depending on the hardness of the material. The same also applies for removal of remainders in which case the ship's bottom is in the direct vicinity of the buckets.

SUMMARY OF THE INVENTION

It is the object of the present invention to effectively prevent these deformations of the buckets in order to thus avoid unnecessary down times of the bucket mechanism and the concomitant high repair costs.

This is accomplished by the present invention in that the receiving elements are formed of a supporting member that is stiff in the transporting direction and an elastically yielding material receiving region disposed therebelow.

Advantageous features of the present invention are defined in the dependent claims.

The supporting member is connected with the traction member, with the actual receiving elements being formed of leaf spring steel supporting frames into which rubber buckets are inserted which deform elastically when compressed by material or the ship's bottom and return to their initial shape when stress relieved. The preshaped leaf springs are preferably articulated to the stiff supporting member. Frequent repairs or new production of the receiving elements are thus avoided which saves money and increases the availability of the devices. In order to loosen up the bulk material and to protect their actual cutting edges, the receiving elements are equipped with ripping teeth. Moreover, in the upper cutting region, each bucket is provided with so-called cutting guide sheets which are interchangeable and set at an angle to produce in this way a better fill of the bucket or buckets.

BRIEF DESCRIPTION OF THE DRAWINGS

One embodiment of the present invention will now be described in greater detail and is illustrated in the drawings, in which.

DETAILED DESCRIPTION OF THE PREFERRED EMBODIMENT

Figure 1:
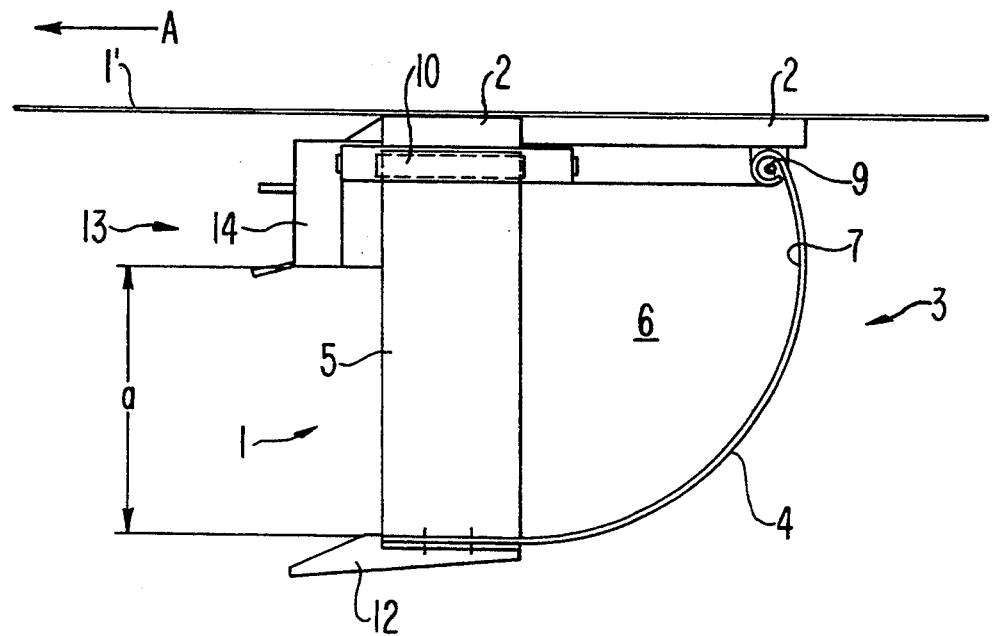
FIG. 1 is a side view of an individual receiving element.
Figure 2:
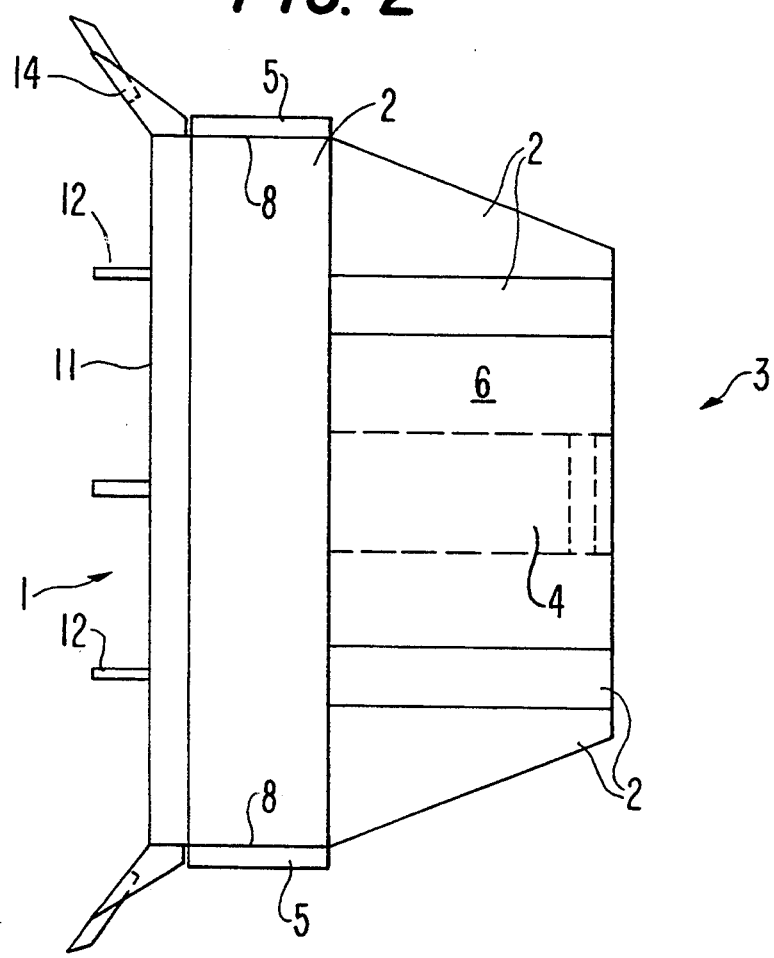
FIG. 2 is a plan view of the receiving element of FIG. 1.

FIGS. 1 and 2 depict different views of a receiving element 1 for a bucket mechanism that is not illustrated in detail, particularly a ship unloader. The bucket mechanism includes a rotating traction member 1' that is movable in a conveying direction A. Receiving element 1 is composed of a multi-part, stiff supporting member 2 as well as an elastically yielding material receiving region 3 disposed therebelow. The material receiving region is formed of an elastically deformable supporting frame 4, 5 which is made of steel leaf springs and accommodates a rubber bucket 6. The individual leaf springs 4 and 5 are disposed, on the one hand, in the rear region 7 and, on the other hand, in the side regions 8 of rubber bucket 6. Leaf springs 4 and 5 are here fastened to the associated regions of supporting member 2 by means of hinges 9 and 10. Material receiving region 3 is thus elastically deformable when compressed by material or the ship's bottom and is able to return to its normal shape when the stress is relieved. The elastic deformation region is here marked a. On the one hand, ripping teeth 12 to loosen up the bulk material and protect cutting edge 11 and, on the other hand in the upper cutting region 13, so-called cut guide sheets 14 to guide the material into rubber bucket 6 are disposed in the region of the cutting edge 11 of rubber buckets 6. The guide elements 14 are here exchangeably fastened in the upper cutting region 13.

It will be understood that the above description of the present invention is susceptible to various modifications, changes and adaptations, and the same are intended to be comprehended within the meaning and range of equivalents of the appended claims.

What is claimed is:

1. A bucket mechanism for unloading a ship, comprising:
   at least one rotating traction member being movable in a conveying direction; and
   individual receiving elements being fastened to said traction member, wherein each receiving element comprises a supporting member that is stiff in the conveying direction and an elastically yielding material receiving region being surrounded by an elastically deformable supporting frame disposed therebelow.

2. A bucket mechanism as defined in claim 1, wherein the material receiving region is formed by a rubber bucket.

3. A bucket mechanism as defined in claim 1, wherein the supporting frame is formed of steel leaf springs.

4. A bucket mechanism as defined in claim 1, wherein the material receiving region comprises a back region and a side wall, and wherein at least one leaf spring is provided in the region of the back and of each side wall of the material receiving region.

5. A bucket mechanism as defined in claim 1, wherein the supporting member is connected with the traction member.

6. A bucket mechanism as defined in claim 1, wherein the elastically deformable supporting frame comprises leaf springs hinged to the supporting member.

7. A bucket mechanism as defined in claim 1, wherein the material receiving region is provided with ripping teeth.

8. A bucket mechanism as defined in claim 1, wherein the material receiving region is equipped with guide sheets that are configured as cutting edges.

9. A bucket mechanism as defined in claim 1, wherein the material receiving region includes an upper cutting region having exchangeable guide sheets.

10. A bucket mechanism as defined in claim 1, wherein the material receiving region includes an upper cutting region having guide sheets arranged at a predetermined angle.

* * * * *